United States Patent
Ozturk et al.

(10) Patent No.: US 11,172,418 B2
(45) Date of Patent: Nov. 9, 2021

(54) CHANNEL LOAD INFORMATION FOR CELL RESELECTION

(71) Applicant: QUALCOMM Incorporated, San Diego, CA (US)

(72) Inventors: Ozcan Ozturk, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 59 days.

(21) Appl. No.: 16/673,531

(22) Filed: Nov. 4, 2019

(65) Prior Publication Data
US 2020/0154324 A1 May 14, 2020

Related U.S. Application Data

(60) Provisional application No. 62/758,083, filed on Nov. 9, 2018.

(51) Int. Cl.
*H04W 36/00* (2009.01)
*H04W 74/08* (2009.01)
*H04W 36/22* (2009.01)
*H04W 36/30* (2009.01)

(52) U.S. Cl.
CPC ....... *H04W 36/0085* (2018.08); *H04W 36/22* (2013.01); *H04W 36/305* (2018.08); *H04W 74/0833* (2013.01)

(58) Field of Classification Search
CPC . H04W 16/14; H04W 36/0085; H04W 36/22; H04W 36/305; H04W 48/06; H04W 48/20; H04W 74/0808; H04W 74/0833
See application file for complete search history.

(56) References Cited

U.S. PATENT DOCUMENTS

| 2009/0190500 | A1  | 7/2009 | Ji et al. |
| 2011/0199905 | A1* | 8/2011 | Pinheiro ............ H04W 4/50 370/235 |
| 2013/0095879 | A1* | 4/2013 | Gupta ............ H04W 76/18 455/525 |
| 2013/0143547 | A1* | 6/2013 | Ye ............ H04W 74/0841 455/422.1 |
| 2014/0162636 | A1  | 6/2014 | Cui et al. |

(Continued)

FOREIGN PATENT DOCUMENTS

| EP | 2600675 A2 | 6/2013 |
| WO | 2013126858 A1 | 8/2013 |

OTHER PUBLICATIONS

Partial International Search Report—PCT/US2019/059836—ISA/EPO—dated Jan. 30, 2020.

(Continued)

*Primary Examiner* — Kashif Siddiqui
(74) *Attorney, Agent, or Firm* — Harrity & Harrity, LLP

(57) ABSTRACT

Various aspects of the present disclosure generally relate to wireless communication. In some aspects, a user equipment may obtain channel load information that is associated with identifying a channel load for one or more cells operating in unlicensed spectrum. The user equipment may perform a cell reselection procedure using a particular cell selected from a plurality of cells based at least in part on the channel load for the one or more cells. Numerous other aspects are provided.

26 Claims, 10 Drawing Sheets

(56) References Cited

U.S. PATENT DOCUMENTS

| | | | |
|---|---|---|---|
| 2015/0057011 A1* | 2/2015 | Di Girolamo | H04W 16/14 |
| | | | 455/454 |
| 2015/0208280 A1 | 7/2015 | Lorca Hernando | |
| 2015/0289182 A1 | 10/2015 | Peisa et al. | |
| 2017/0231011 A1* | 8/2017 | Park | H04W 74/006 |
| 2020/0028558 A1* | 1/2020 | Yerramalli | H04B 7/0456 |
| 2020/0260499 A1* | 8/2020 | Sarkis | H04L 5/10 |
| 2021/0014703 A1* | 1/2021 | Chou | H04W 74/0866 |

OTHER PUBLICATIONS

International Search Report and Written Opinion—PCT/US2019/059836—ISA/EPO—dated Mar. 31, 2020.

\* cited by examiner

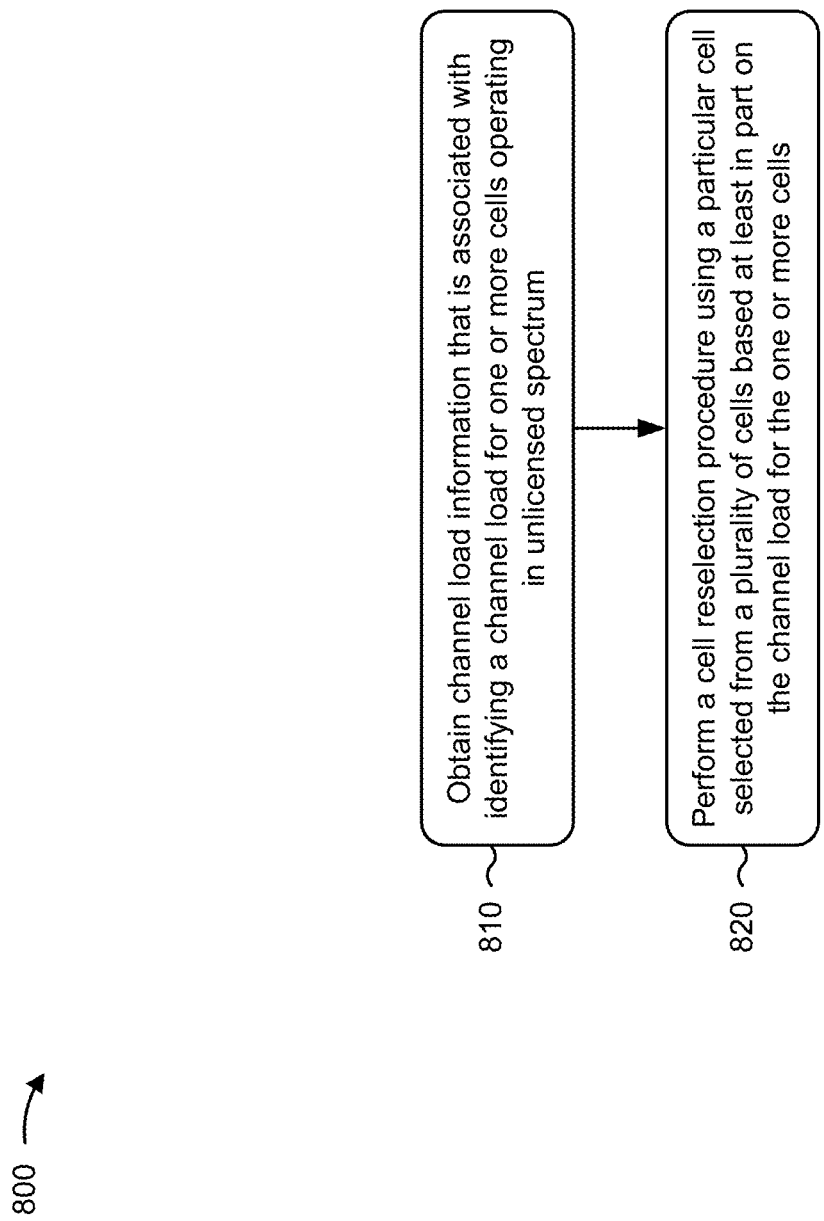

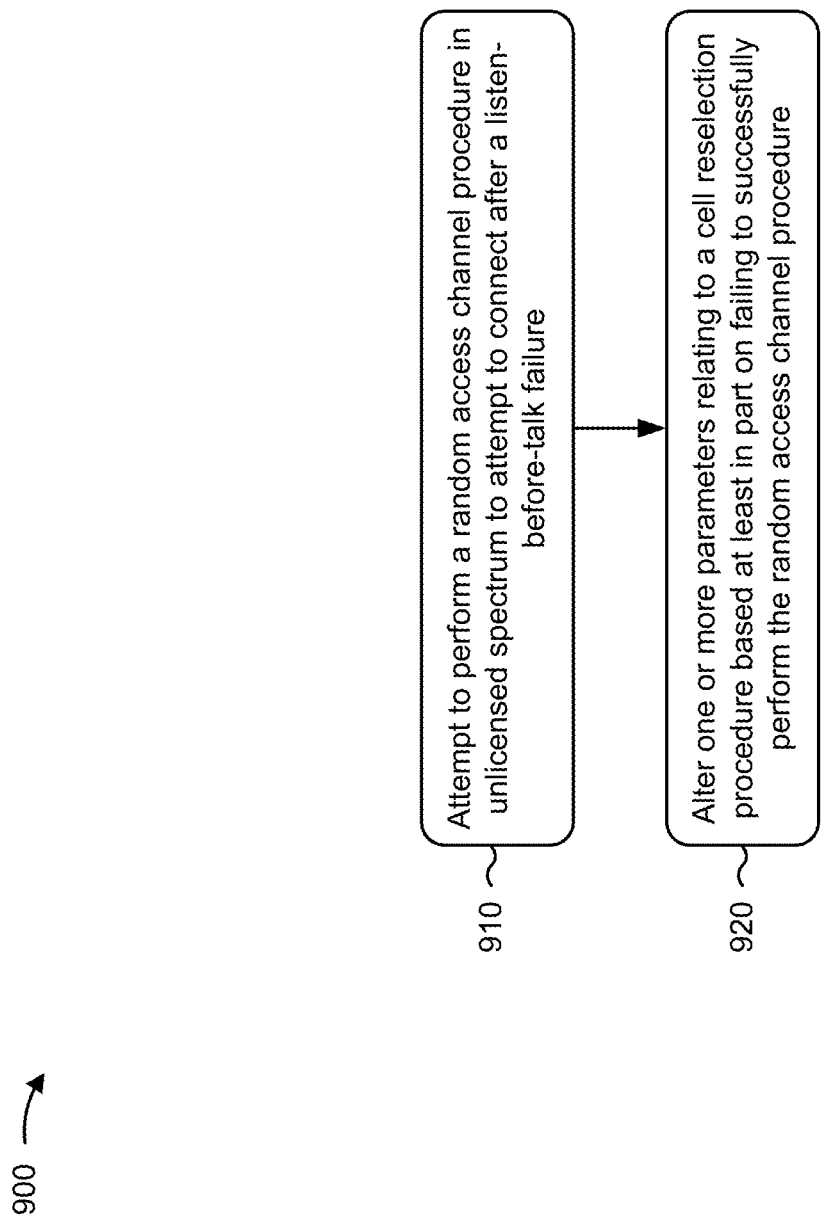

CHANNEL LOAD INFORMATION FOR CELL RESELECTION

CROSS-REFERENCE TO RELATED APPLICATION

This application claims priority to U.S. Provisional Patent Application No. 62/758,083, filed on Nov. 9, 2018, entitled "CHANNEL LOAD INFORMATION FOR CELL RESELECTION," which is hereby expressly incorporated by reference herein.

FIELD OF THE DISCLOSURE

Aspects of the present disclosure generally relate to wireless communication, and more particularly to techniques and apparatuses for using channel load information for cell reselection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include obtaining channel load information that is associated with identifying a channel load for one or more cells operating in unlicensed spectrum. The method may include performing a cell reselection procedure using a particular cell selected from a plurality of cells based at least in part on the channel load for the one or more cells.

In some aspects, a UE for wireless communication may include memory and one or more processors operatively coupled to the memory. The memory and the one or more processors may be configured to obtain channel load information that is associated with identifying a channel load for one or more cells operating in unlicensed spectrum. The memory and the one or more processors may be configured to perform a cell reselection procedure using a particular cell selected from a plurality of cells based at least in part on the channel load for the one or more cells.

In some aspects, a non-transitory computer-readable medium may store one or more instructions for wireless communication. The one or more instructions, when executed by one or more processors of a UE, may cause the one or more processors to obtain channel load information that is associated with identifying a channel load for one or more cells operating in unlicensed spectrum. The one or more instructions, when executed by the one or more processors of the UE, may cause the one or more processors to perform a cell reselection procedure using a particular cell selected from a plurality of cells based at least in part on the channel load for the one or more cells.

In some aspects, an apparatus for wireless communication may include means for obtaining channel load information that is associated with identifying a channel load for one or more cells operating in unlicensed spectrum. The apparatus may include means for performing a cell reselection procedure using a particular cell selected from a plurality of cells based at least in part on the channel load for the one or more cells.

In some aspects, a method of wireless communication, performed by a UE may include attempting to perform a random access channel procedure in unlicensed spectrum to attempt to connect after a listen-before-talk failure. The method may include altering one or more parameters relating to a cell reselection procedure based at least in part on failing to successfully perform the random access channel procedure.

In some aspects, a UE for wireless communication may include memory and one or more processors operatively coupled to the memory. The memory and the one or more processors may be configured to attempt to perform a random access channel procedure in unlicensed spectrum to attempt to connect after a listen-before-talk failure. The memory and the one or more processors may be configured to alter one or more parameters relating to a cell reselection procedure based at least in part on failing to successfully perform the random access channel procedure.

In some aspects, a non-transitory computer-readable medium may store one or more instructions for wireless communication. The one or more instructions, when executed by one or more processors of a UE, may cause the one or more processors to attempt to perform a random access channel procedure in unlicensed spectrum to attempt to connect after a listen-before-talk failure. The one or more instructions, when executed by the one or more processors of the UE, may cause the one or more processors to alter one or more parameters relating to a cell reselection procedure based at least in part on failing to successfully perform the random access channel procedure.

In some aspects, an apparatus for wireless communication may include means for attempting to perform a random access channel procedure in unlicensed spectrum to attempt to connect after a listen-before-talk failure. The apparatus may include means for altering one or more parameters relating to a cell reselection procedure based at least in part on failing to successfully perform the random access channel procedure.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a diagram illustrating an example process performed, for example, by a user equipment, in accordance with various aspects of the present disclosure.

FIG. 9 is a diagram illustrating an example process performed, for example, by a user equipment, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
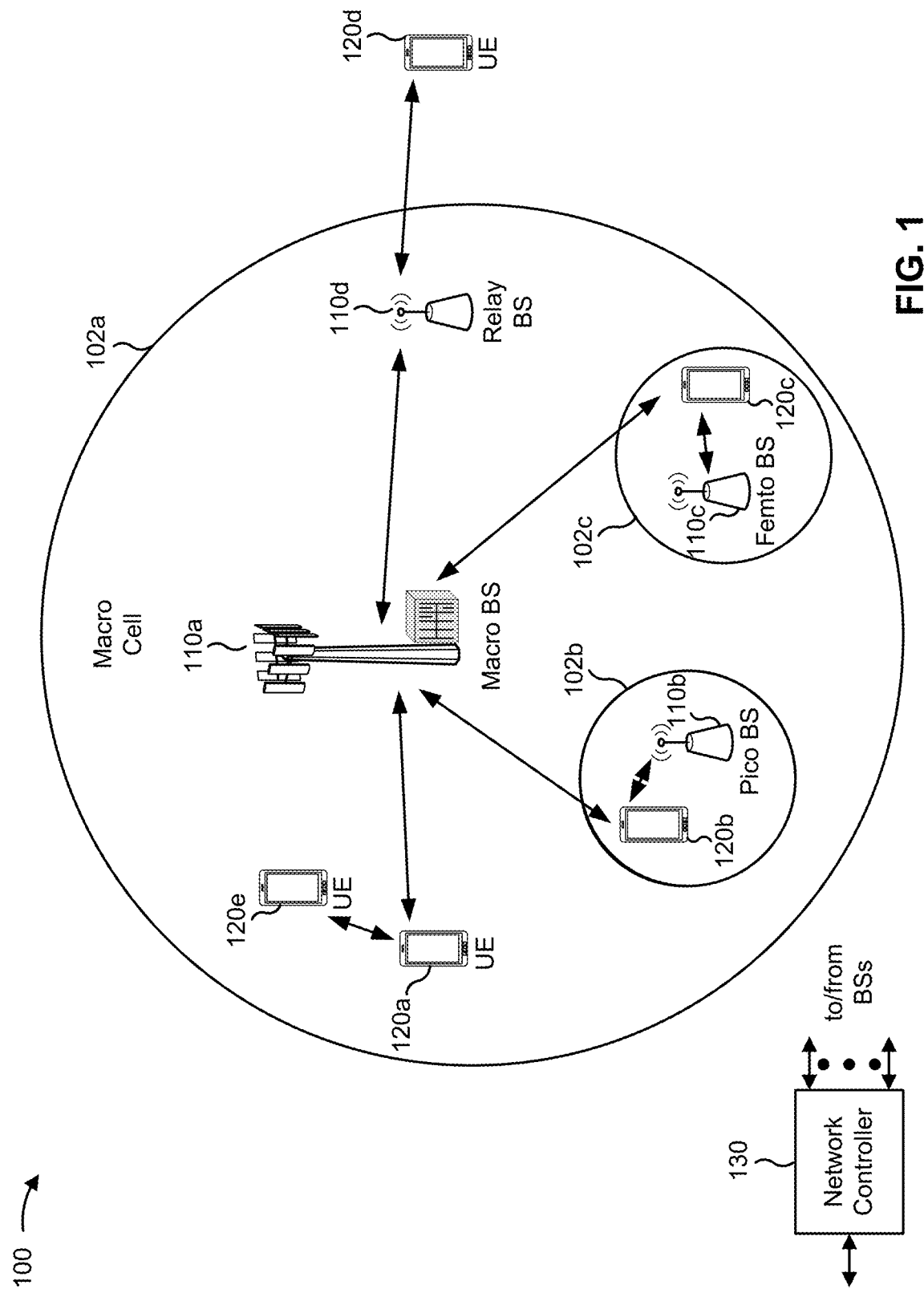
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what was described with regard to FIG. 1.

Figure 2:
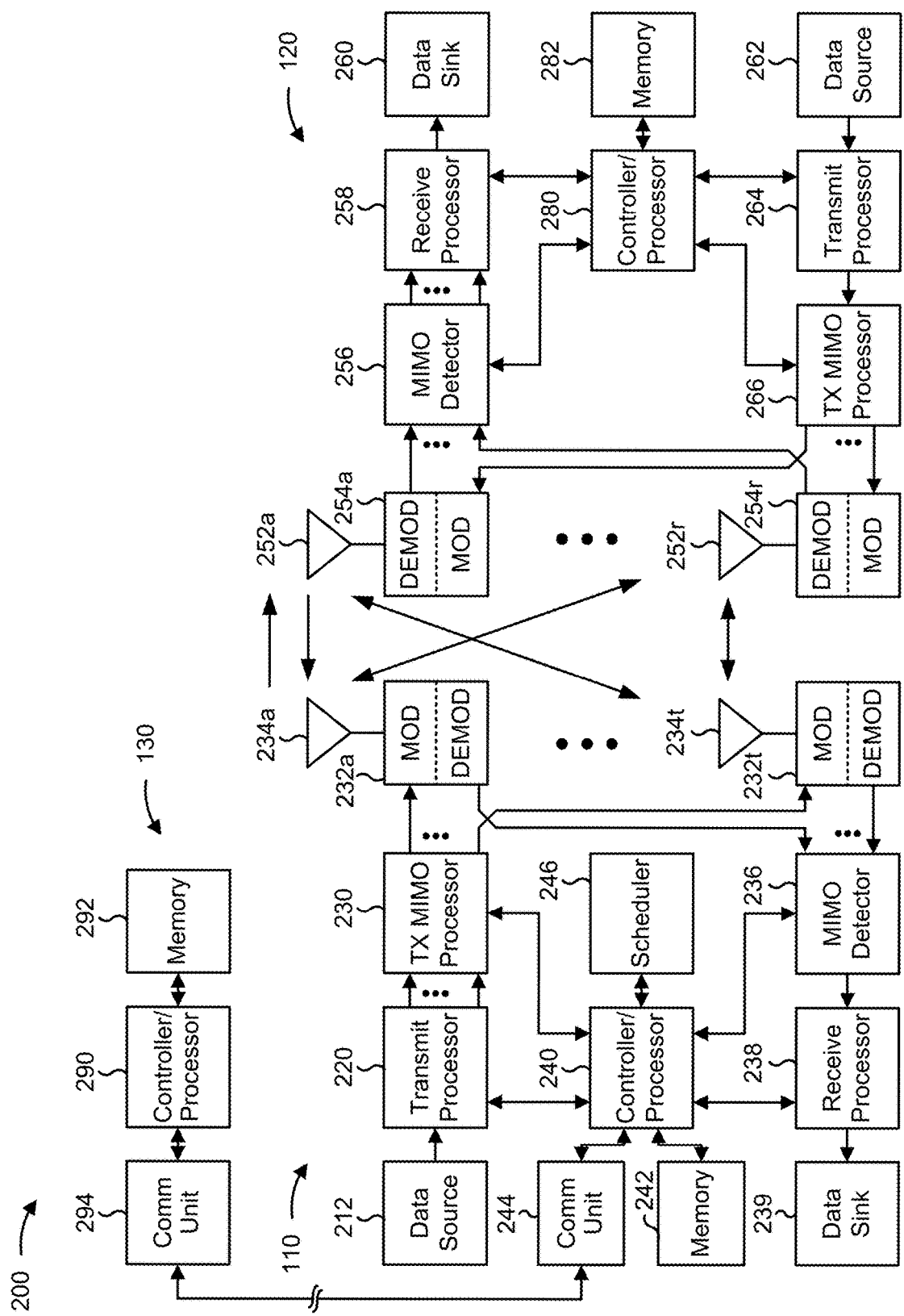
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with using channel load information for cell reselection, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for obtaining channel load information that is associated with identifying a channel load for one or more cells operating in unlicensed spectrum, means for performing a cell reselection procedure using a particular cell selected from a plurality of cells based at least in part on the channel load for the one or more cells, and/or the like. In some aspects, UE 120 may include means for attempting to perform a random access channel procedure in unlicensed spectrum to attempt to connect after a listen-before-talk failure, means for altering one or more parameters relating to a cell reselection procedure based at least in part on failing to successfully perform the random access channel procedure, and/or the like. In some aspects, such means may include one or more components of UE 120 described in connection with FIG. 2.

As indicated above, FIG. 2 is provided merely as an example. Other examples may differ from what was described with regard to FIG. 2.

Figure 3A:
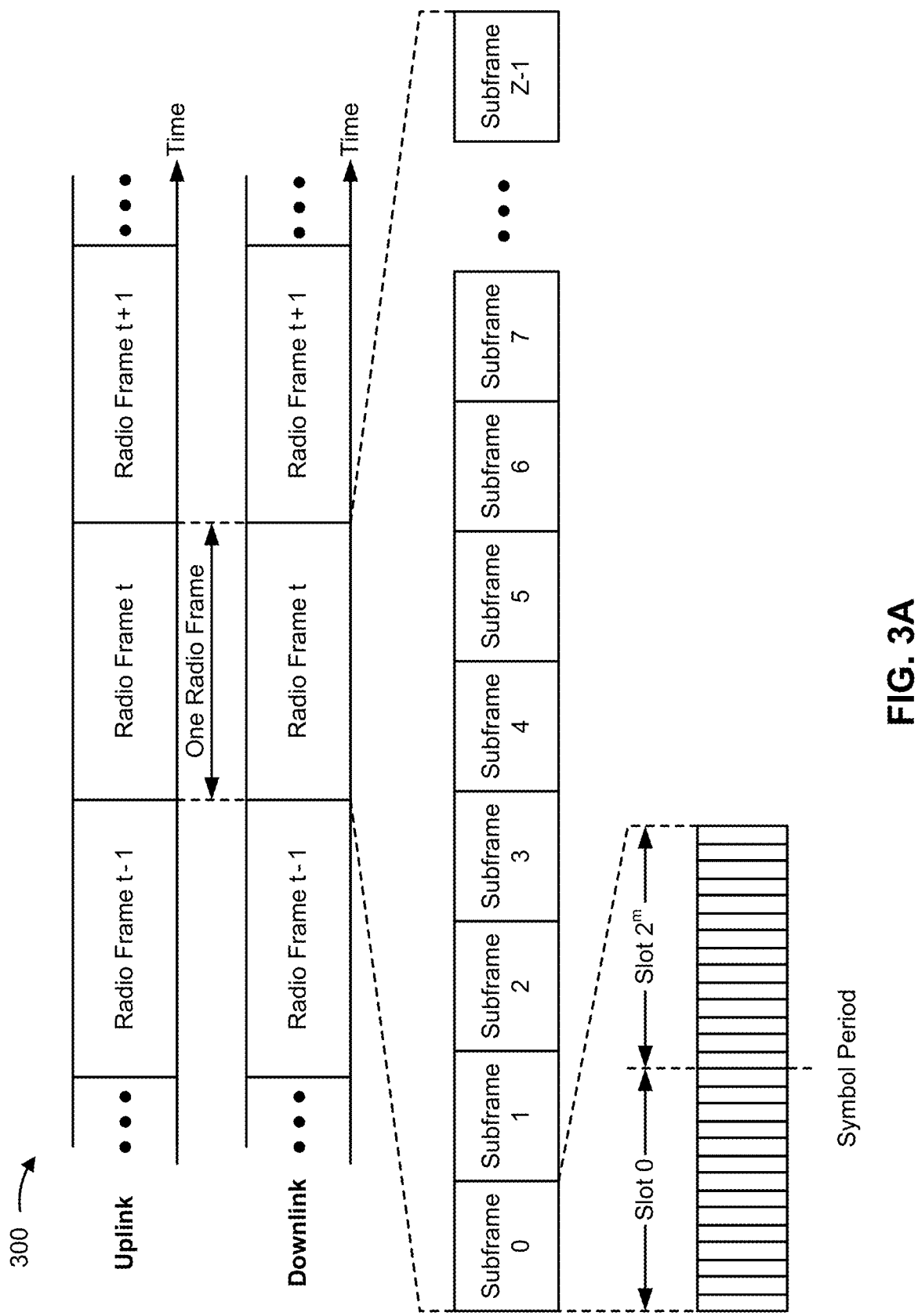
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z-1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2 L symbol periods, where the 2 L symbol periods in each subframe may be assigned indices of 0 through 2 L-1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
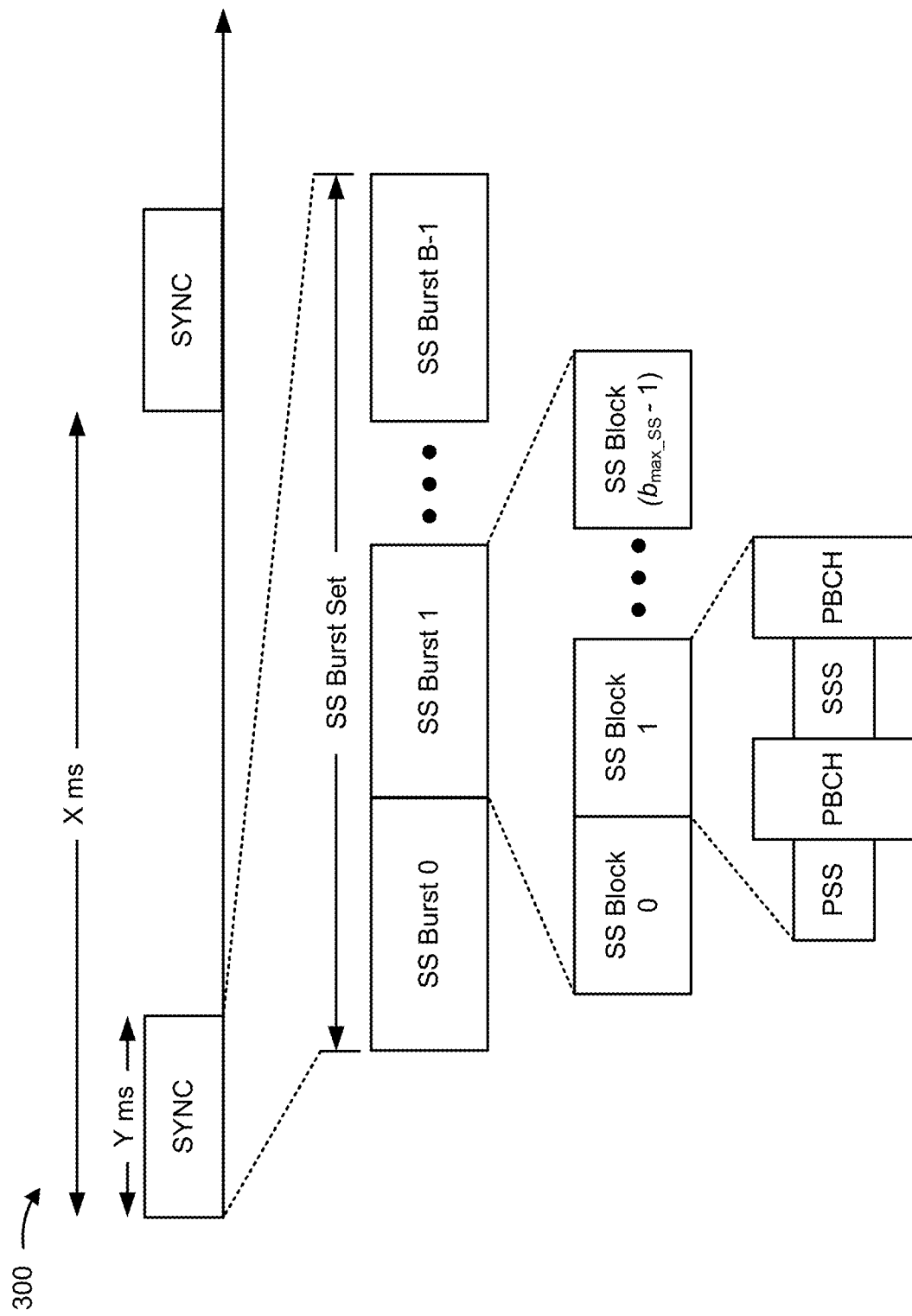
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what was described with regard to FIGS. 3A and 3B.

Figure 4:
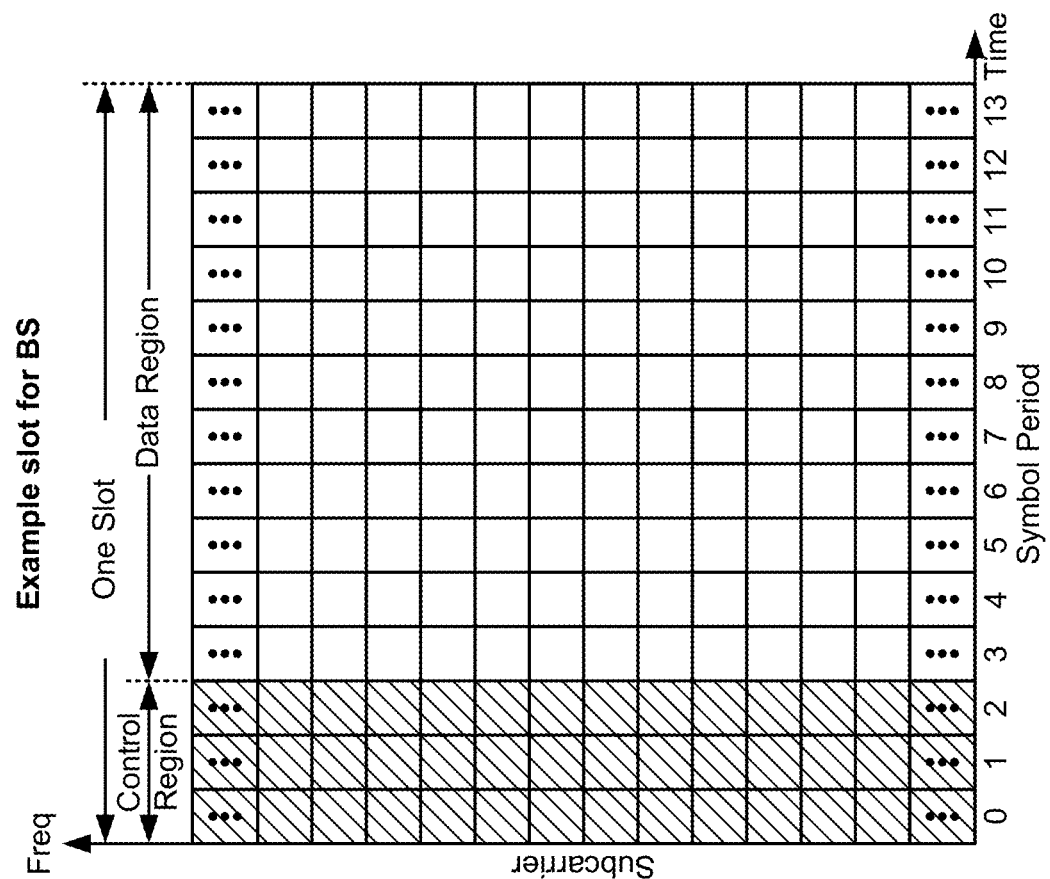
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using time division duplexing (TDD). NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what was described with regard to FIG. 4.

Figure 5:
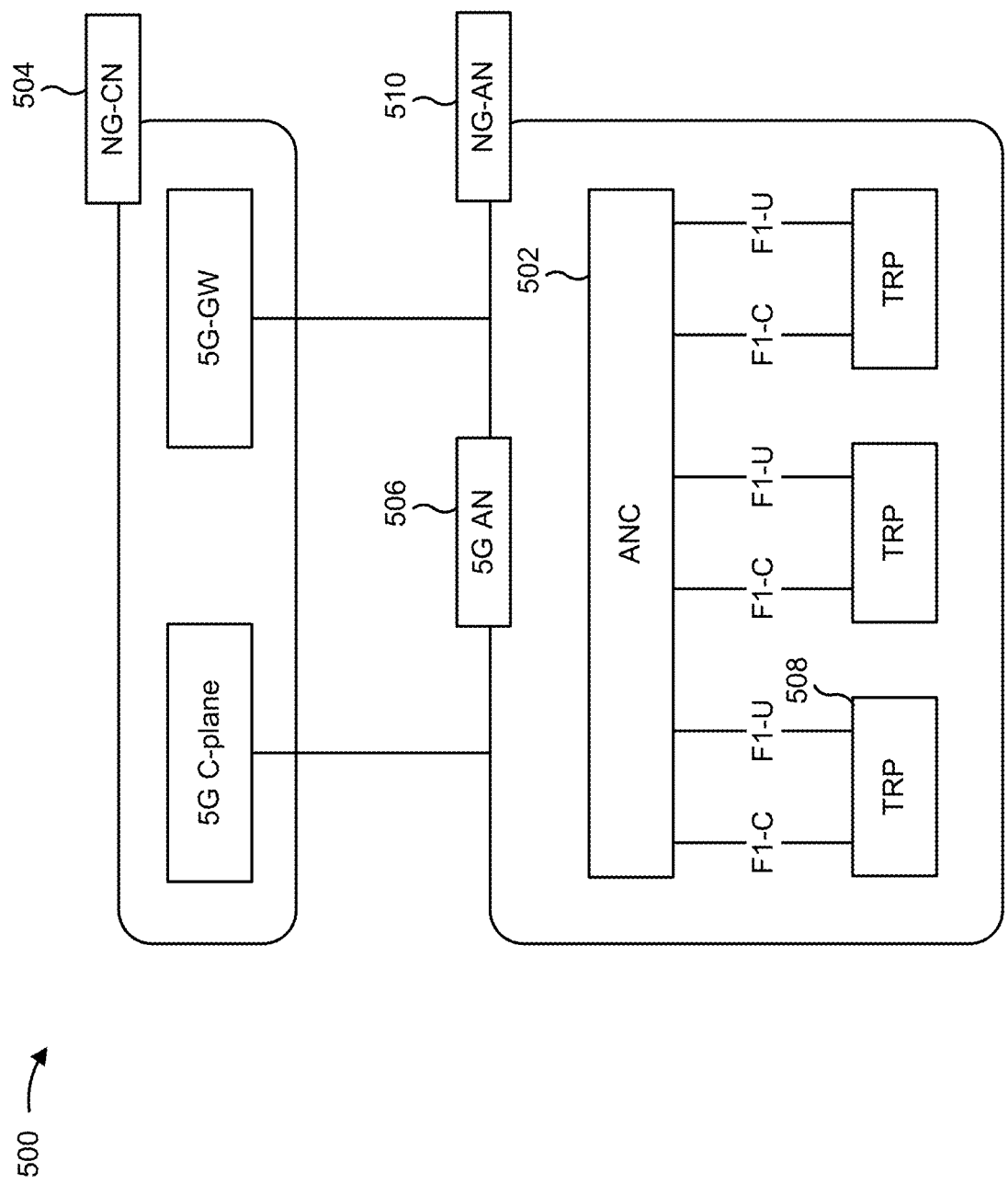
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what was described with regard to FIG. 5.

Figure 6:
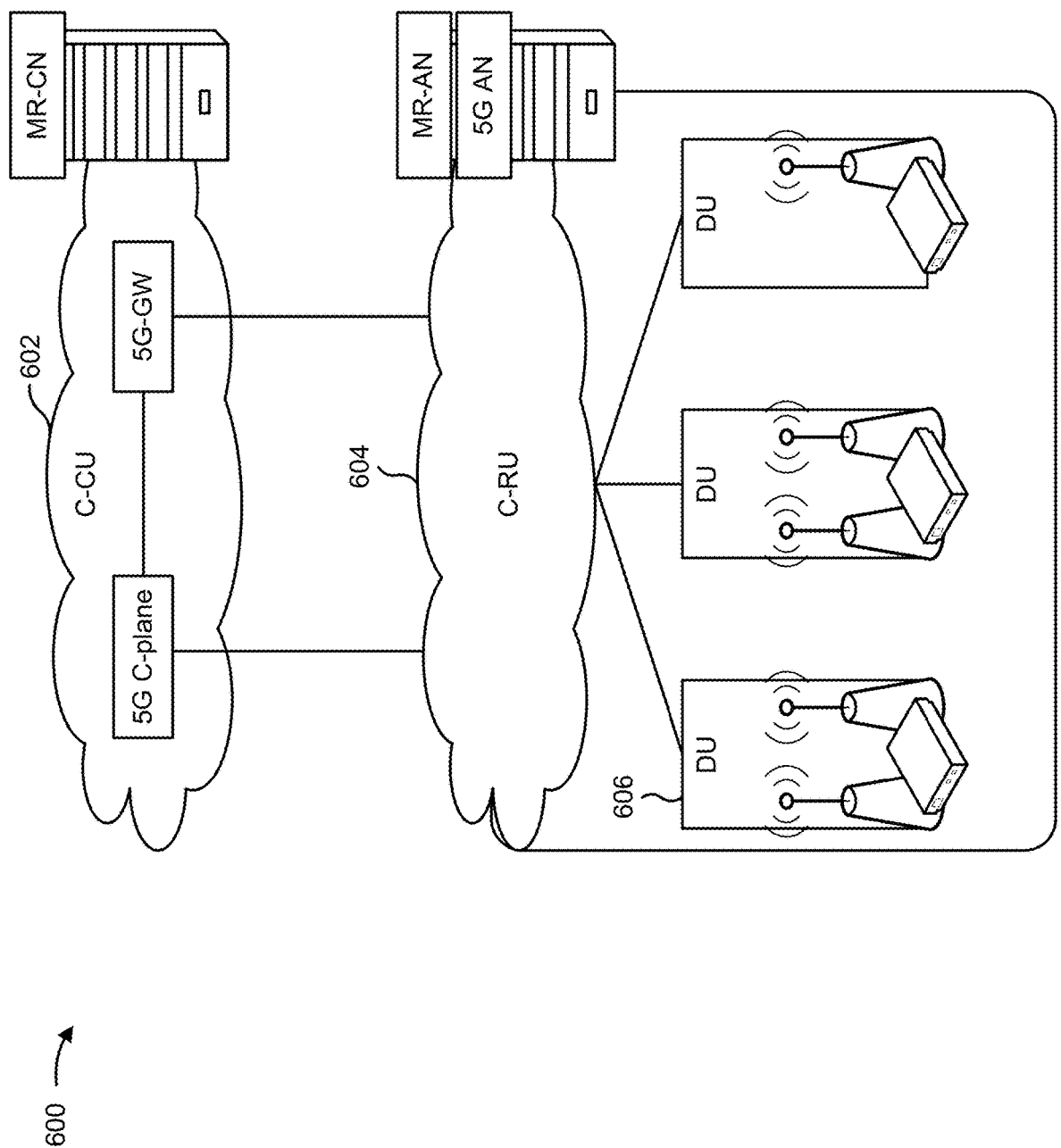
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples may differ from what was described with regard to FIG. 6.

Some frequency ranges may be reserved for unlicensed spectrum. In unlicensed spectrum deployments, different operators, organizations, and/or technologies may use different portions of the unlicensed spectrum concurrently. For example, a plurality of operators may deploy NR networks, WiFi networks, LTE networks, and/or the like at a single location using the unlicensed spectrum for communication. In this case, each operator, organization, and/or technology may be uncoordinated with other operators, organizations, and/or technologies operating at a common location and using a common set of frequency bands. For example, a first BS for a first operator may not coordinate with a second BS for a second operator. Alternatively, a single operator may deploy a plurality of ad-hoc cells without a central entity to coordinate the plurality of ad-hoc cells. For example, a first BS for an operator and a second BS for the operator may lack central coordination via a central entity.

Although entities in unlicensed spectrum may lack central coordination, operation may be ad-hoc coordinated using different coordination techniques, such as listen-before-talk (LBT) coordination. In LBT coordination, an entity, such as a BS, may transmit during a transmission period to indicate that the BS is to reserve one or more resources (e.g., a particular frequency at a particular time) for communication. In this case, the BS may use the one or more resources for communication based at least in part on a prioritization, based at least in part on not detecting other entities attempting to reserve the one or more resources, and/or the like.

As a result of using unlicensed spectrum without central coordination, different channels and/or carriers may be associated with different channel loads. A UE may attempt to communicate with a BS of a group of BSs using unlicensed spectrum, but may use a carrier associated with a threshold channel load, which may result in interference from other BSs of the group of BSs using the channel. Further, using a cell associated with a threshold channel load may result in low latency (e.g., as a result of a plurality of entities attempting to reserve resources using an LBT procedure for other respective cells). A BS may schedule a UE for a less loaded channel of a cell, relative to other channels of other cells, when the UE is operating in a connected mode.

However, when a UE attempts to reselect to a channel of a cell, the UE may inadvertently reselect to a channel of a cell that is not associated with less than a threshold channel load.

Some aspects, described herein, may enable cell reselection using channel load information to improve a likelihood that a UE reselects to a channel associated with less than a threshold channel load. In this way, the UE may camp onto a cell that provides more reliable paging (e.g., in an Idle mode) and/or improved throughput and/or latency (e.g., in a Connected mode) relative to performing a cell reselection procedure without obtaining channel load information. Moreover, a UE may determine, based at least in part on a random access channel (RACH) failure associated with a connection attempt, to bar a cell or reduce a priority of a frequency for subsequent cell reselection. In this way, the UE may reduce a likelihood of using the cell and/or the frequency for subsequent connection attempts, thereby improving a likelihood of connecting to a cell with less than a threshold channel load.

Figure 7:
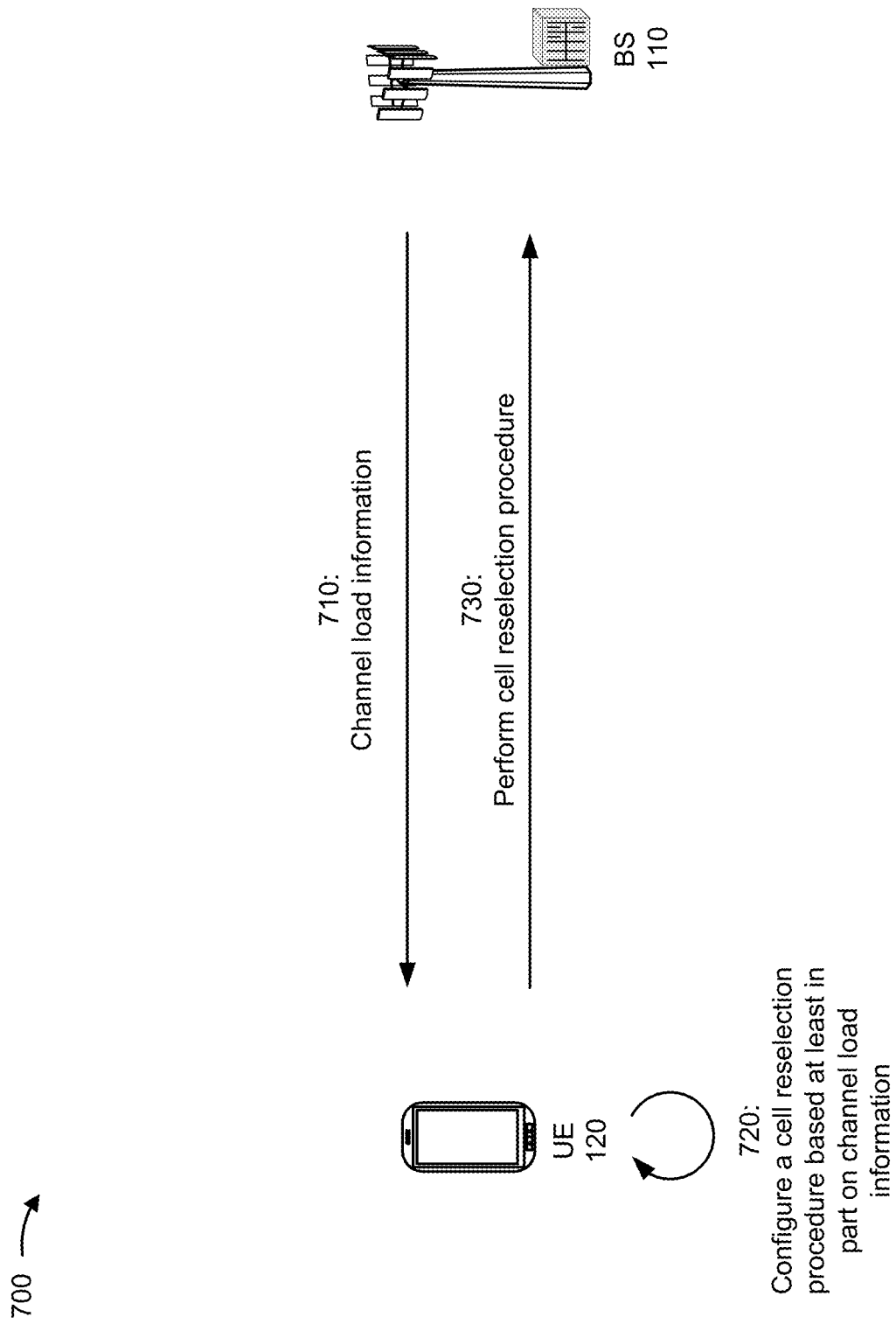
FIG. 7 is a diagram illustrating an example of using channel load information for cell reselection, in accordance with various aspects of the present disclosure.

FIG. 7 is a diagram illustrating an example 700 of using channel load information for cell reselection, in accordance with various aspects of the present disclosure. As shown in FIG. 7, example 700 may include a BS 110 and a UE 120.

As further shown in FIG. 7, and by reference number 710, UE 120 may obtain channel load information. For example, UE 120 may receive channel load information from BS 110. In some aspects, UE 120 may receive channel load information regarding one or more neighbor cells of BS 110. For example, when UE 120 and BS 110 are operating in unlicensed spectrum, BS 110 may communicate with other BSs 110 over an Xn interface to obtain channel load information. In this case, BS 110 may transmit the channel load information to identify channel loads associated with the one or more neighbor cell to enable UE 120 to reselect to a cell with less than a threshold channel load. Additionally, or alternatively, UE 120 may receive frequency-level channel load information associated with a set of frequencies used for communication by one or more other BSs 110.

In some aspects, UE 120 may receive channel load information identifying a set of offsets to a reference parameter. For example, BS 110 may provide information identifying a set of offsets for reference signal received signal strengths for a set of signals associated with a set of cells. In this case, UE 120 may derive a channel load for a set of channels based at least in part on the set of offsets for the reference signal received signal strengths.

In some aspects, UE 120 may receive channel load information from BS 110 and regarding a cell provided by BS 110. For example, each BS 110 may broadcast channel load information about a corresponding cell, and UE 120 may receive the channel load information to enable cell reselection to a cell with less than a threshold channel load. In some aspects, UE 120 may receive the channel load information via a system information block (SIB) message. For example, UE 120 may receive a SIB type 1 (SIB1) message identifying channel load information for a cell of BS 110. Additionally, or alternatively, UE 120 may receive a master information block (MIB) message or another signal.

In some aspects, UE 120 may receive information identifying a channel measurement. For example, BS 110 may determine a measurement of a channel load, a received signal strength indicator (RSSI), and/or the like based at least in part on information received from UE 120 when UE 120 is operating in a connected mode and/or one or more other UEs operating in a connected mode. In this case, BS 110 may provide channel load information including one or more parameters, such as a channel load parameter, an RSSI parameter, and/or the like. Additionally, or alternatively, BS 110 may determine, based at least in part on a measurement, a minimum reference signal received power (RSRP), a minimum reference signal received quality (RSRQ), a minimum signal to interference noise ratio (SINR), and/or the like for a channel, and may transmit information identifying an RSRP parameter, an RSRQ parameter, an SINR parameter, and/or the like. In this case, UE 120 may determine the channel load for the channel based at least in part on the RSRP parameter, the RSRQ parameter, the SINR parameter, and/or the like.

In some aspects, UE 120 may receive quantitative channel load information. For example, UE 120 may receive information identifying a channel load value associated with a particular scale (e.g., a value on a 1 to 100 scale). Additionally, or alternatively, UE 120 may receive information identifying a categorical load value, such as information classifying a cell as highly loaded or not highly loaded. In some aspects, UE 120 may receive a plurality of different indicators of a channel load. Although some aspects are described in terms of particular types of quantitative or qualitative channel loading information, other types of quantitative or qualitative channel loading information are possible.

In some aspects, UE 120 may obtain information regarding channel load without receiving an explicit indication of the channel load. For example, UE 120 may perform one or more measurements of a channel to determine a channel load. In this case, UE 120 may measure a percentage of time during a measurement period that a channel RSSI satisfies a threshold, and may determine a channel load based at least in part on the percentage of time during the measurement period. Additionally, or alternatively, UE 120 may perform a random access channel (RACH) procedure. In this case, if the RACH procedure fails, UE 120 may determine that the channel is associated with a threshold channel load, and may alter one or more parameters relating to the channel. For example, UE 120 may alter a channel priority for reselection of the channel, UE 120 may bar the channel from reselection, and/or the like.

As further shown in FIG. 7, and by reference number 720, UE 120 may configure a cell reselection procedure based at least in part on the channel load information. For example, UE 120 may determine a cell with less than a threshold channel load for reselection, may identify a plurality of cells with less than a threshold channel load for reselection, and/or the like. In some aspects, UE 120 may configure the cell reselection procedure based at least in part on a plurality of factors, such as both a minimum RSRP requirement and a minimum SINR requirement.

In some aspects, UE 120 may adjust a cell priority or a frequency priority for cell reselection based at least in part on the channel load information. For example, UE 120 may reduce a cell priority for a cell based at least in part on a RACH failure. In some aspects, UE 120 may select a particular cell for camping. For example, UE 120 may receive the channel load information identifying the channel measurement, and may delay processing the channel load information until after a camping decision (e.g., determining to camp onto a particular cell). In this case, UE 120 may alter the camping decision and may determine not to camp and/or to bar a cell based at least in part on processing the channel load information. Further, UE 120 may determine a different cell on which to camp. In some aspects, UE 120 may obtain threshold information identifying a threshold for selecting a cell for cell reselection. For example, during an idle state or an inactive state, UE 120 may receive information identifying the threshold, and may use the threshold to make a camping decision and/or to configure the cell reselection procedure.

As further shown in FIG. 7, and by reference number 730, UE 120 may perform the cell reselection procedure. For example, UE 120 camp onto a particular cell, transition to a connected mode, and/or the like based at least in part on the channel load information. In some aspects, UE 120 may perform the cell reselection procedure in accordance with one or more parameters, such as a prioritization relating to a frequency, a cell, and/or the like. In some aspects, UE 120 may avoid a particular cell. For example, based at least in part on barring a first cell, UE 120 may reselect to second cell that is different from the first cell.

As indicated above, FIG. 7 is provided as an example. Other examples may differ from what was described with respect to FIG. 7.

FIG. 8 is a diagram illustrating an example process 800 performed, for example, by a UE, in accordance with various aspects of the present disclosure. Example process 800 is an example where a UE (e.g., UE 120) performs cell reselection using channel load information.

As shown in FIG. 8, in some aspects, process 800 may include obtaining channel load information that is associated with identifying a channel load for one or more cells operating in unlicensed spectrum (block 810). For example, the UE (e.g., using antenna 252, DEMOD 254, MIMO detector 256, receive processor 258, controller/processor 280, and/or the like) may obtain channel load information that is associated with identifying a channel load for one or more cells operating in unlicensed spectrum, as described in more detail above.

As shown in FIG. 8, in some aspects, process 800 may include performing a cell reselection procedure using a particular cell selected from a plurality of cells based at least in part on the channel load for the one or more cells (block 820). For example, the UE (e.g., using controller/processor 280, transmit processor 264, TX MIMO processor 266, MOD 254, antenna 252, and/or the like) may perform a cell reselection procedure using a particular cell selected from a plurality of cells based at least in part on the channel load for the one or more cells, as described in more detail above.

Process 800 may include additional aspects, such as any single aspect and/or any combination of aspects described below and/or in connection with one or more other processes described elsewhere herein.

With respect to process 800, in a first aspect, the UE may receive, from a base station associated with a first cell, the channel load information associated with a second cell that is different from the first cell. With respect to process 800, in a second aspect or in combination with the first aspect, the UE may receive, from a base station associated with at least one cell of the plurality of cells, the channel load information associated with the at least one cell of the plurality of cells.

With respect to process 800, in a third aspect, alone or in combination with one or more of the first and second aspects, the channel load information includes information regarding at least one of a load associated with a particular frequency parameter, a cell quality parameter, a offset parameter identifying an offset to another parameter, a received signal strength indication parameter, a served traffic load parameter, an estimated traffic load parameter, a reference signal received power parameter, a reference signal received quality parameter, a signal to interference noise ratio parameter, a cell priority parameter, a prioritization parameter, a combination thereof. With respect to process 800, in a fourth aspect, alone or in combination with one or more of the first through third aspects, the channel load information is communicated via at least one of an Xn interface message, a system information block message, a master information block message, a radio resource control message, a combination thereof.

With respect to process 800, in a fifth aspect, alone or in combination with one or more of the first through fourth aspects, the channel load information includes information identifying a set of channel load related measurements performed by a set of connected UEs. With respect to process 800, in a sixth aspect, alone or in combination with one or more of the first through fifth aspects, the UE is caused to process the channel load information after selecting another cell for camping and to change which cell is selected for camping. With respect to process 800, in a seventh aspect, alone or in combination with one or more of the first through sixth aspects, the UE may adjust a cell selection or a frequency priority based at least in part on the channel load information.

With respect to process 800, in an eighth aspect, alone or in combination with one or more of the first through seventh aspects, the UE may perform one or more measurements of one or more signals, and may process the one or more measurements to determine the channel load information. With respect to process 800, in a ninth aspect, alone or in combination with one or more of the first through eighth aspects, the UE is caused to perform the one or more measurements after selecting another cell for camping. With respect to process 800, in a tenth aspect, alone or in combination with one or more of the first through ninth aspects, the UE may measure the channel load without receiving any channel load information from a base station.

With respect to process 800, in an eleventh aspect, alone or in combination with one or more of the first through tenth aspects, the UE may determine to not camp onto the particular cell, frequency, channel, or combination thereof, or may bar the particular cell, frequency, channel, or combination thereof from subsequent camping attempts. With respect to process 800, in a twelfth aspect, alone or in combination with one or more of the first through eleventh aspects, the UE may determine whether to camp onto the particular cell based at least in part on one or more thresholds relating to the channel load information. With respect to process 800, in a thirteenth aspect, alone or in combination with one or more of the first through twelfth aspects, the one or more thresholds are configured by at least one of a broadcast signal or a dedicated signal. With respect to process 800, in a fourteenth aspect, alone or in combination with one or more of the first through thirteenth aspects, the channel load information identifies a categorical value or a quantitative value.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a UE, in accordance with various aspects of the present disclosure. Example process 900 is an example where a UE (e.g., UE 120) performs cell reselection procedure adjustment.

As shown in FIG. 9, in some aspects, process 900 may include attempting to perform a random access channel procedure in unlicensed spectrum to attempt to connect after a listen-before-talk failure (block 910). For example, the UE (e.g., using controller/processor 280, transmit processor 264, TX MIMO processor 266, MOD 254, antenna 252, and/or the like) may attempt to perform a random access channel procedure in unlicensed spectrum to attempt to connect after a listen-before-talk failure, as described in more detail above.

As shown in FIG. 9, in some aspects, process 900 may include altering one or more parameters relating to a cell reselection procedure based at least in part on failing to successfully perform the random access channel procedure (block 920). For example, the UE (e.g., using controller/processor 280 and/or the like) may alter one or more parameters relating to a cell reselection procedure based at least in part on failing to successfully perform the random access channel procedure, as described in more detail above.

Process 900 may include additional aspects, such as any single aspect and/or any combination of aspects described below and/or in connection with one or more other processes described elsewhere herein.

With respect to process 900, in a first aspect, the UE may bar a cell, frequency, channel, or combination thereof from cell reselection or may alter a priority of a cell, frequency, channel or combination thereof for cell reselection. With respect to process 900, in a second aspect, alone or in combination with the first aspect, the UE may select, after the random access channel procedure failed for a first cell or a first frequency, a second cell or a second frequency.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment, comprising:
   attempting to perform a random access channel procedure in unlicensed spectrum to attempt to connect after a listen-before-talk failure; and
   altering one or more parameters relating to a channel and a cell reselection procedure based at least in part on failing to successfully perform the random access channel procedure and based at least in part on the channel being associated with a threshold channel load.

2. The method of claim 1, wherein altering the one or more parameters comprises at least one of:
   barring a cell, a frequency, the channel, or a combination thereof from cell reselection, or
   altering a priority of the cell, the frequency, the channel, or the combination thereof for cell reselection.

3. The method of claim 1, further comprising:
   selecting, after the random access channel procedure failed for a first cell or a first frequency, a second cell or a second frequency.

4. A user equipment for wireless communication, comprising:
   a memory; and
   one or more processors operatively coupled to the memory, the memory and the one or more processors configured to:
      attempt to perform a random access channel procedure in unlicensed spectrum to attempt to connect after a listen-before-talk failure; and
      alter one or more parameters relating to a channel and a cell reselection procedure based at least in part on failing to successfully perform the random access channel procedure and based at least in part on the channel being associated with a threshold channel load.

5. The user equipment of claim 4, wherein the one or more processors, when altering the one or more parameters, are configured to:
   bar a cell, a frequency, the channel, or a combination thereof from cell reselection, or
   alter a priority of the cell, the frequency, the channel, or the combination thereof for cell reselection.

6. The user equipment of claim 4, wherein the one or more processors are further configured to:
  select, after the random access channel procedure failed for a first cell or a first frequency, a second cell or a second frequency.

7. The user equipment of claim 4, wherein the threshold channel load is associated with information regarding at least one of:
  a load associated with a particular frequency parameter,
  a cell quality parameter,
  an offset parameter identifying an offset to another parameter,
  a received signal strength indication parameter,
  a served traffic load parameter,
  an estimated traffic load parameter,
  a reference signal received power parameter,
  a reference signal received quality parameter,
  a signal to interference noise ratio parameter,
  a cell priority parameter, a prioritization parameter, or
  a combination thereof.

8. The user equipment of claim 4, wherein the one or more processors, when altering the one or more parameters relating to the channel and the cell reselection procedure, are configured to:
  alter the one or more parameters, relating to the channel and the cell reselection procedure, based at least in part on failing to successfully perform the random access channel procedure and without receiving an explicit indication of a channel load.

9. The user equipment of claim 4, wherein the one or more processors are further configured to:
  configure the cell reselection procedure based at least in part on altering the one or more parameters relating to the channel and the cell reselection procedure.

10. The user equipment of claim 9, wherein the one or more processors, when configuring the cell reselection procedure, are configured to:
  configure the cell reselection procedure based at least in part on altering the one or more parameters relating to the channel and the cell reselection procedure and based at least in part on a plurality of cells having less than the threshold channel load.

11. The user equipment of claim 9, wherein the one or more processors, when configuring the cell reselection procedure, are further configured to:
  configure the cell reselection procedure is based at least in part on altering the one or more parameters relating to the channel and the cell reselection procedure and based at least in part on a minimum reference signal received power, associated with the channel, and a signal-to-noise-and-interference ratio associated with the channel.

12. The user equipment of claim 4, wherein the one or more processors, when attempting to perform the random access channel procedure, are further configured to:
  attempt to perform the random access channel procedure in unlicensed spectrum to attempt to connect after the listen-before-talk failure and during an idle state, of the user equipment, or an inactive state of the user equipment.

13. The user equipment of claim 4, wherein the one or more processors are further configured to:
  perform the cell reselection procedure based at least in part on altering the one or more parameters relating to the channel and the cell reselection procedure.

14. The user equipment of claim 13, wherein the one or more processors, when performing the cell reselection procedure, are configured to:
  camp onto a particular cell based at least in part on altering the one or more parameters relating to the channel and the cell reselection procedure and based at least in part on channel load information associated with the channel, or
  transition to a connected mode based at least in part on altering the one or more parameters relating to the channel and the cell reselection procedure and based at least in part on channel load information associated with the channel.

15. The method of claim 1, further comprising:
  selecting, after the random access channel procedure failed for a first cell or a first frequency, a second cell or a second frequency.

16. The method of claim 1, wherein the threshold channel load is associated with information regarding at least one of:
  a load associated with a particular frequency parameter,
  a cell quality parameter,
  an offset parameter identifying an offset to another parameter,
  a received signal strength indication parameter,
  a served traffic load parameter,
  an estimated traffic load parameter,
  a reference signal received power parameter,
  a reference signal received quality parameter,
  a signal to interference noise ratio parameter,
  a cell priority parameter,
  a prioritization parameter, or
  a combination thereof.

17. The method of claim 1, wherein altering the one or more parameters relating to the channel and the cell reselection procedure comprises:
  altering the one or more parameters, relating to the channel and the cell reselection procedure, based at least in part on failing to successfully perform the random access channel procedure and without receiving an explicit indication of a channel load.

18. The method of claim 1, further comprising:
  configuring the cell reselection procedure based at least in part on altering the one or more parameters relating to the channel and the cell reselection procedure.

19. The method of claim 18, wherein configuring the cell reselection procedure comprises:
  configuring the cell reselection procedure based at least in part on altering the one or more parameters relating to the channel and the cell reselection procedure and based at least in part on a plurality of cells having less than the threshold channel load, or
  configuring the cell reselection procedure is based at least in part on altering the one or more parameters relating to the channel and the cell reselection procedure and based at least in part on a minimum reference signal received power, associated with the channel, and a signal-to-noise-and-interference ratio associated with the channel.

20. The method of claim 1, further comprising:
  performing the cell reselection procedure based at least in part on altering the one or more parameters relating to the channel and the cell reselection procedure.

21. The method of claim 20, wherein performing the cell reselection procedure comprises:
  camping onto a particular cell based at least in part on altering the one or more parameters relating to the channel and the cell reselection procedure and based at least in part on channel load information associated with the channel, or transitioning to a connected mode based at least in part on altering the one or more parameters relating to the channel and the cell reselection procedure and based at least in part on channel load information associated with the channel.

22. A non-transitory computer-readable medium storing a set of instructions for wireless communication, the set of instructions comprising:

one or more instructions that, when executed by one or more processors of a user equipment, cause the one or more processors to:

attempt to perform a random access channel procedure in unlicensed spectrum to attempt to connect after a listen-before-talk failure; and alter one or more parameters relating to a channel and a cell reselection procedure based at least in part on failing to successfully perform the random access channel procedure and based at least in part on the channel being associated with a threshold channel load.

23. The non-transitory computer-readable medium of claim 22, wherein the one or more instructions, that cause the one or more processors to alter the one or more parameters, cause the one or more processors to:

bar a cell, a frequency, the channel, or a combination thereof from cell reselection, or alter a priority of the cell, the frequency, the channel, or the combination thereof for cell reselection.

24. The non-transitory computer-readable medium of claim 22, wherein the one or more instructions, when executed by the one or more processors, further cause the one or more processors to:

select, after the random access channel procedure failed for a first cell or a first frequency, a second cell or a second frequency.

25. An apparatus for wireless communication, comprising:

means for attempting to perform a random access channel procedure in unlicensed spectrum to attempt to connect after a listen-before-talk failure; and means for altering one or more parameters relating to a channel and a cell reselection procedure based at least in part on failing to successfully perform the random access channel procedure and based at least in part on the channel being associated with a threshold channel load.

26. The apparatus of claim 25, wherein altering the one or more parameters comprising:

barring a cell, a frequency, the channel, or a combination thereof from cell reselection, or altering a priority of the cell, the frequency, the channel, or the combination thereof for cell reselection.

* * * * *